United States Patent [19]

Harris et al.

[11] Patent Number: 4,785,072

[45] Date of Patent: Nov. 15, 1988

[54] POLYARYL ETHER SULPHONES

[75] Inventors: James E. Harris, Piscataway, N.J.; Louis M. Maresca, Pittsfield, Mass.; Markus Matzner, Edison, N.J.

[73] Assignee: Amoco Corporation, Chicago, Ill.

[21] Appl. No.: 81,344

[22] Filed: Aug. 4, 1987

Related U.S. Application Data

[63] Continuation-in-part of Ser. No. 701,306, Feb. 13, 1985, abandoned, and a continuation-in-part of Ser. No. 701,234, Feb. 13, 1985, abandoned.

[51] Int. Cl.[4] .................... C08G 65/22; C08G 65/40
[52] U.S. Cl. .................... 528/125; 528/126; 528/128; 528/174
[58] Field of Search ............. 528/125, 126, 128, 174

[56] References Cited

U.S. PATENT DOCUMENTS

| 3,647,751 | 3/1972 | Darsow | 528/174 |
|---|---|---|---|
| 3,939,119 | 2/1976 | O'Shea | 528/174 |
| 3,948,857 | 4/1976 | Feasey et al. | 528/174 |
| 4,010,147 | 3/1977 | Rose | 528/174 |
| 4,105,635 | 8/1978 | Freeman | 528/126 |
| 4,105,636 | 8/1978 | Taylor | 528/126 |
| 4,200,727 | 4/1980 | Blinne et al. | 528/125 |
| 4,296,217 | 10/1981 | Stuart-Webb | 528/174 |
| 4,303,776 | 12/1981 | Baron et al. | 528/174 |
| 4,331,798 | 5/1982 | Staniland | 528/125 |

FOREIGN PATENT DOCUMENTS 1295584  11/1972  United Kingdom .

Primary Examiner—Morton Foelak
Assistant Examiner—S. A. Acquah
Attorney, Agent, or Firm—Richard J. Schlott; William H. Magidson; Ralph C. Medhurst

[57] ABSTRACT

Aryl ether sulfone polymers comprising a 4,4'-bisphenylsulfonyl biphenyl and at least two additional arylene structural units exhibit improved toughness and stress crack resistance and a reduced tendency toward crystallization. The polymers and soluble and film-forming from solution, and may be used as coating and impregnating resins for producing laminates, fiber-reinforced composites and the like.

16 Claims, No Drawings

POLYARYL ETHER SULPHONES

CROSS REFERENCE TO RELATED APPLICATIONS

This application is a continuation-in-part of application Ser. Nos. 701,306 and 701,234, both filed Feb. 13, 1985, now both abandoned.

BACKGROUND OF THE INVENTION

This invention is directed to novel aryl ether sulphone polymers containing the following ether-linked units:

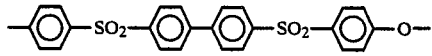

and two or more of the following:

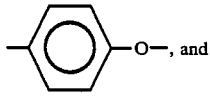

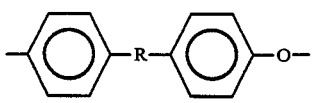

wherein R is selected from $SO_2$, SO, O, CO, $C_1$–$C_4$ alkylidene and a direct bond.

A select class of polyaryl ether sulphones containing a unit derived from 4,4-bis(p-halophenylsulfonyl)diphenyl is described in the art. U.S. Pat. No. 3,647,751 depicts polymers of the following formula:

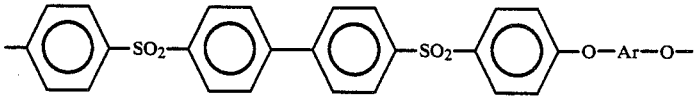

wherein Ar is defined as a diphenylene or naphthylene radical or a polynuclear divalent radical of formula:

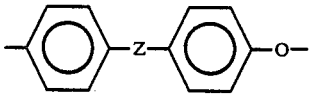

wherein Z is a divalent aliphatic, cycloaliphatic or araliphatic radical containing 1–8 carbon atoms or —O—, —S—, —SO—, —$SO_2$— or —CO—. Example 3 of U.S. Pat. No. 3,647,751, the only example of a polymer derived from a 4,4-bis(p-halobenzenesulfonyl)biphenyl, depicts the following structure:

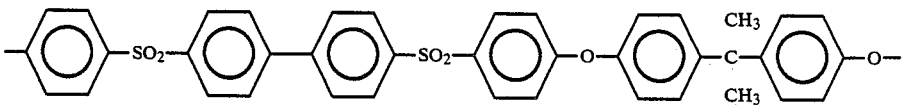

U.S. Pat. No. 3,634,355 describes a number of polymers prepared from 4,4′-bis(4-chlorophenylsulphonyl)-biphenyl. In Example 5 the following polymer is provided:

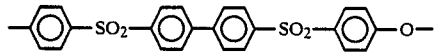

In example 16 the following polymer is depicted:

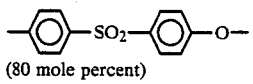

(80 mole percent)

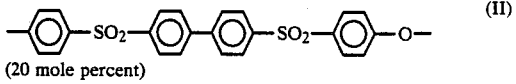

(20 mole percent)

In example 17 the same structure is shown except that both units (I) and (II) are present in amouants of 50 mole percent.

U.S. Pat No. 4,009,149 describes, as the sole polymer therein, an aromatic polysulphone consisting of repeating units having the formula:

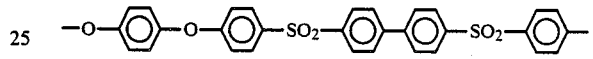

The polymer is described as amorphous and having a glass transition temperature (Tg) of about 260° C. However, applicants have prepared this polymer (See Control B in Table I) and found it to be slightly crystalline and not amorphous.

British Patent Specification No. 1,295,584, in Table 1, describes a polymer produced from hydroquinone and 4,4′-bis(4-chlorophenylsulphonyl)biphenyl. This polymer is structurally the same as the polymer of U.S. Pat. No. 4,009,149 depicted above. However, the polymer is described in the British Specification as crystalline in that it has a crystalline melting point of 350° C. Also described in Table 1 of the British Specification are polymers prepared from dithiohydroquinone and 4,4′-bis(4-chlorophenylsulphonyl)biphenyl and from monothiohydroquinone and 4,4′-bis(4-chlorophenyl-sulphonyl)biphenyl. The latter polymer is described as amorphous. Example 4 of the British Specification describes the preparation of a polymer from monothiohydroquinone, 4,4′-dichlorodiphenylsulphone and 4,4′-bis(4-chlorophenyl-sulphonyl)biphenyl.

U.S. Pat. No. 4,008,203 broadly discloses a host of polysulphones. Although this patent does not specifically disclose or describe polymers derived from 4,4-bis(halophenylsulfonyl)biphenyl, the repeat unit defined broadly therein might be construed by some as having a unit that could be derived from 4,4-bis(halophenylsulfonyl)biphenyl.

The polymers of the prior art produced from hydroquinone and 4,4-bis(4-chlorophenylsulphonyl)biphenyl as described in U.S. Pat. No. 4,009,149 and British Patent Specification No. 1,295,584 are deficient in that they do not readily dissolve in common solvents such as N-methylpyrrolidinone and therefore cannot be cast into film. The polymers produced from 4,4'-bis(4-chlorophenylsulphonyl)biphenyl and biphenol as described in U.S. Pat. No. 3,647,751 are crystalline polymers having a Tg of 270° C. They do not readily dissolve in common solvents such as N-methylpyrrolidinone and are difficult to cast into film or spin into hollow fibers.

Many of the prior art resins based on 4,4-bis(4chlorophenylsulfonyl)biphenyl tend to be rigid and somewhat brittle, particularly when crystalline. In addition, the presence of a high crystalline melt temperature for some of these materials hinders thermal processing and may limit their use, particularly in the production of thermoformable goods and laminates.

Heat resistant, amorphous thermoplastic resins with good toughness that are more readily processable both thermally and from solution would be a useful advance in the art. Such thermoplastics would be particularly useful in the production of laminates and fiber-reinforced composites where good thermoforming characteristics, a useful degree of solubility sufficient to permit impregnating and coating operations, and good film-forming properties are particularly important.

SUMMARY OF THE INVENTION

The aryl ether sulfone thermoplastic polymers of this invention contain at least three of the structural units depicted below. The polymers are amorphous, tough and easily processable, and the melt processing characteristics of the polymers of this invention may be modified by varying the relative proportion of the units contained therein without significantly reducing heat resistance as reflected by Tg. Compositions of this invention also exhibit good environmental resistance including solvent stress-crack resistance and low moisture absorption. Further, the polymers of this invention are soluble in N-methylpyrrolidinone, and solutions of these resins can be cast into film and may also be used to coat or impregnate various substrates. The polymers of this invention, in combination with structural fiber, form fiber-reinforced thermoplastic composites having good mechanical properties.

DETAILED DESCRIPTION

The aryl ether sulphone polymers useful for the purposes of this invention contain the following structural units:

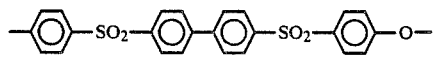

and two or more of the following:

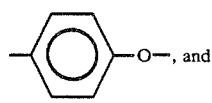

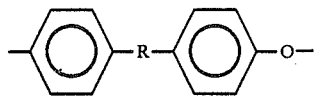

wherein R is selected from SO$_2$, SO, O, CO, C$_1$-C$_4$ alkylidene and a direct bond, and wherein the units are linked through ether oxygens. A preferred polymer contains the following units:

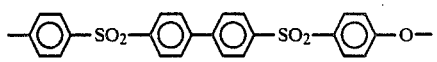

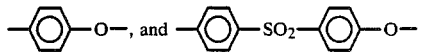

Another preferred polymer contains the following units:

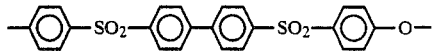

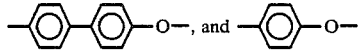

Another preferred polymer contains the following units:

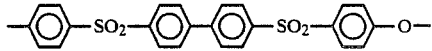

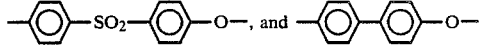

Of course it is apparent that the terminal oxygen atom depicted in the above units may be on either end of the unit, with each unit being interconnected through only the ether oxygen.

The polymer typically contains from about 10 to about 90, preferably from about 30 to about 70 mole percent of the structural unit derived from 4,4-bis(p-halophenylsulfonyl)biphenyl and from about 5 to about 50, preferably from about 5 to about 30 mole percent of each of the other unit or units, at least three units being present in the polymer, and the total always equalling 100 mole percent.

The polymers of this invention may be produced by any of the methods described in the patents discussed above in which a bisphenol (or dialkali metal salt thereof) is caused to react with a dihalobenzenoid compound; the bisphenols having the formula:

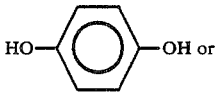

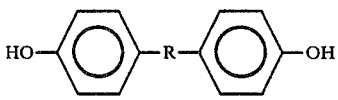

wherein R is as defined above; or their alkali metal salts and the dihalobenzenoid compound having the formula:

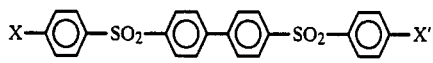

or optionally,

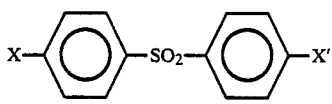

wherein X and X' are halogen atoms, preferably the same and preferably chlorine or fluorine.

In another embodiment the polymers of the present invention can also be prepared by condensing the following bisphenol structure with hydroquinone and 4,4' dichlorodiphenyl sulfone:

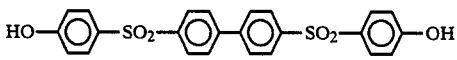

Still another embodiment of the invention makes use of partial hydrolysis products such as

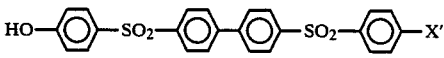

to give rise to the units

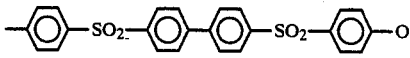

Another embodiment as a component of the polymers of this invention which leads to interesting materials having a block structure comprises hydrolyzing the dihalo intermediates to give oligomer intermediates such as, e.g.

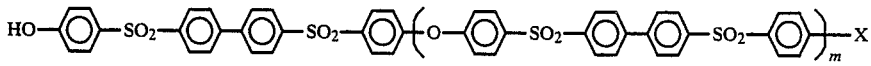

or

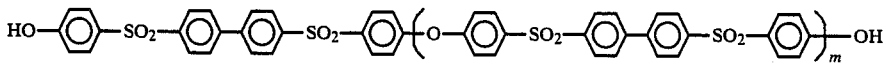

or

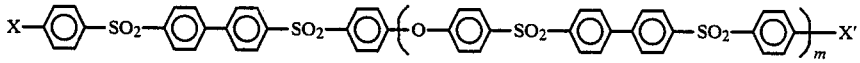

wherein m is an integer of from 1 to 100. The oligomers can be condensed as described above to yield polymers that contain blocks of the units

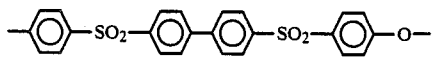

In the polymers of this invention further combinations and permutations are quite numerous as will be obvious to those skilled in the art. It will also be readily apparent to those skilled in the condensation polymer art that the particular arrangement of the above-defined structural units forming the polymers of this invention will depend upon the particular starting materials selected and polycondensation process employed. Each of the actual repeating units of these polymers may thus consist of two of the above-defined structural units, one derived from a dihalomonomer and one derived from a diphenol, linked through ether oxygen, or, alternatively, may consist of single structural units derived by a self-condensation process as previously described.

The polymers of this invention have a reduced viscosity of from about 0.2 to about 1.0, preferably from about 0.4 to about 0.7 dl/g as measured in N-methylpyrrolidinone at 25° C. (0.2 grams/100 ml). The polymers are substantially non-crystalline and have a Tg of from about 230° to about 290°, preferably from about 250° to about 270° C.

The polymers of this invention are preferably prepared by contacting substantially equimolar amounts of the hydroxy containing compounds and halo containing compounds with from about 0.5 to about 1.0 mole of an alkali metal carbonate per mole of hydroxyl group, in a solvent mixture comprising a solvent which forms an azeotrope with water in order to maintain the reaction medium at substantially anhydrous conditions during the polymerization and a polar aprotic solvent.

The temperature of the reaction mixture is kept at from about 120° to about 180° C., for about 1 to about 5 hours and then raised and kept at from about 200° to about 250° C., preferably from 210° to about 230° C., for about 1 to 10 hours.

The reaction is carried out in an inert atmosphere, e.g., nitrogen, at atmospheric pressure, although higher or lower pressures may also be used.

The polyarylether sulfone is then recovered by conventional techniques such as coagulation, solvent evaporation, and the like.

The polymers of this invention have a reduced susceptibility to crystallize from solution which allows improvements in their manufacturing and recovery procedure. It is conventional in polyarylether sulphone synthesis to remove the salt by-product by filtration of the reaction mixture prior to coagulation or desolubilization. Removal of the salt improves electrical properties, increases transparency and improves melt stability. Attempts to filter a sulfolane reaction solution of the copolymer from hydroquinone and 4,4'-bis(4-chlorophenylsulphonyl)biphenyl were unsuccessful due to crystallization of the polymer when cooled to temperatures at which the solubility of the by-products is minimized. The polymer produced from 4,4'-bis(4-chlorophenylsulphonyl)biphenyl, hydroquinone and biphenol (100:30:70) does not crystallize from a room temperature sulfolane solution, optionally containing chlorobenzene. When filtered and recovered by coagulation, the polymer was obtained in near quantitative yields with a polymer salt content of <50 parts per million (ppm). Without filtration, salt concentrations of >500 ppm are routinely observed.

The solvent mixture comprises a solvent which forms an azeotrope with water and a polar aprotic solvent. The solvent which forms an azeotrope with water includes an aromatic hydrocarbon such as benzene, toluene, xylene, ethylbenzene, chlorobenzene, and the like.

The polar aprotic solvents employed are those generally known in the art for the manufacture of polyarylether sulfones and include sulfur containing solvents such as those of the formula:

$$R_5-S(O)_b-R_5$$

in which each $R_5$ represents a monovalent lower hydrocarbon group free of aliphatic unsaturation, which preferably contains less than about 8 carbon atoms or when connected together represents a divalent alkylene group with b being an integer from 1 to 2 inclusive. Thus, in all of these solvents all oxygens and two carbon atoms are bonded to the sulfur atom. Contemplated for use in this invention are such solvents as those having the formula:

$$R_6-\overset{O}{\underset{O}{S}}-R_6 \text{ and } R_6-\overset{O}{S}-R_6$$

where the $R_6$ groups are independently lower alkyl, such as methyl, ethyl, propyl, butyl, and like groups, and aryl groups such as phenyl and alkylphenyl groups such as the tolyl group, as well as those wherein the $R_6$ groups are interconnected to form a cycloalkylene group such as may be found for example in tetrahydrothiophene oxides and dioxides. Specifically, these solvents include dimethylsulfoxide, dimethylsulfone, diphenylsulfone, diethylsulfoxide, diethylsulfone, diisopropylsulfone, tetrahydrothiophene-1,1-dioxide (commonly called tetramethylene sulfone or sulfolane) and tetrahydrothiophene-1-monoxide.

Additionally, nitrogen containing aprotic solvents may be used. These include dimethylacetamide, dimethylformamide and N-methylpyrrolidinone.

The azeotrope-forming solvent and polar aprotic solvent are used in a weight ratio of from about 1:10 to about 1:1 preferably from about 1:5 to about 1:3.

During the reaction, the hydroxy containing compound is slowly converted, in situ, to the alkali salt thereof by reacting with the alkali metal carbonate or bicarbonate. The alkali metal carbonate or bicarbonate is preferably potassium carbonate or bicarbonate. Mixtures of carbonates such as potassium and sodium carbonate or bicarbonate may also be used.

Water is continuously removed from the reaction mass as an azeotrope with the azeotrope forming solvent so that substantially anhydrous conditions are maintained during the polymerization.

The reaction medium should be maintained substantially anhydrous during the polycondensation in order to secure high molecular weight polymers. It is preferred that the system should preferably contain less than 0.5 percent by weight water throughout the reaction.

The polyaryl ether sulfones of this invention may be combined with mineral fillers such as carbonates including chalk, calcite, and dolomite; silicates including mica, talc, wollastonite; silicon dioxide; glass spheres; glass powders; aluminum; clay; quartz; and the like. Also, reinforcing fibers such as fiberglass, carbon fibers, and the like may be used. The compositions may also include additives such as titanium dioxide; thermal stabilizers, ultraviolet light stabilizers, plasticizers, and the like.

The polyaryl ether sulfones of this invention may be employed in combination with fiber reinforcement in the preparation of structural composites. The structural fibers which may be used in preparing such composites include carbon, graphite, glass, silicon carbide, poly(benzothiazole), poly(benzimidazole), poly(benzoxazole), alumina, titania, boron, and aromatic polyamide fibers. These fibers are characterized by a tensile strength of greater than 100,000 psi, a tensile modulus of greater than two million psi, and a decomposition temperature of greater than 200° C. The fibers may be used in the form of continuous tows (1,000 to 400,000 filaments each), woven cloth, whiskers, chopped fiber or random mat. The preferred fibers are carbon fibers, aromatic polyamide fibers such as Kevlar 49 fiber (obtained from E. I. DuPont de Nemours, Inc.), silicon carbide fibers, and glass fibers. Composites generally comprise about 20 to about 80 percent by weight of structural fiber, and preferably between 30 and 75 percent by weight.

The structural fiber will ordinarily be combined with the curable resin compositions of this invention to provide preimpregnated reinforcement or prepreg. Prepreg may be prepared by any of the several techniques well-known and commonly used in the art. For example, the resin may be first formed into a thin film by solution coating or by extrusion. Aligned tapes or sheets of carbon fiber are layered with the film, then molded under heat and pressure to melt-impregnate the fibers and fuse the sheets. Alternatively, the tape, sheet or fabric may be impregnated with solution of the resin, dried to remove the solvent, and layed up in the same manner as prepreg. Molding with heat and pressure serves to fuse the layers and form the composite. Composites may also be prepared from the compositions of this invention via wet lay-up followed by compression molding, by transfer molding, or by a hot melt process such as is described in European Patent Application No. 102,158, published Mar. 7, 1984. Composites employing the compositions of this invention may also be fabricated in a filament-winding operation, wherein preimpregnated tow is wound over a rotating and removable form or mandrel and fused under heat and pressure.

In addition to structural fibers, the composites may also contain particulate fillers such as talc, mica, calcium carbonate, aluminum trihydrate, glass microballoons, phenolic thermospheres, and carbon black as well as thixotropic additives such as fumed silica. Up to half of the weight of structural fiber in the composition may be replaced by one or more of such fillers.

The polyaryl ether sulfones may also be fabricated into any other desired shape, i.e., moldings, coatings, films, or fibers.

EXAMPLES

The following examples serve to give specific illustrations of the practice of this invention but they are not intended in any way to limit the scope of this invention.

General Polymerization Procedure—Example 1

The polymerization setup consisted of a 1-liter 4-necked round bottomed flask equipped with a nitrogen inlet tube, mechanical stirrer and a Claisen adapter. In one neck of the adapter was placed a thermocouple connected to a thermal controller and in the other neck was a Dean Stark trap filter with a condenser. To the flask were added 45.31 g (0.09 mole) of 4,4'-bis(4-chlorophenyl sulfonyl)biphenyl, 12.48 g (0.067 mole) of biphenol, 5.51 g (0.022 mole) of dihydroxy diphenyl sulfone 0.34 g (0.002 mole) of p-phenylphenol for controlling molecular weight, 14.93 g (0.108 mole) of potassium carbonate, 11 g sulfolane and 110 g chlorobenzene. The mixture was first degassed by bubbling nitrogen through the mixture for ½ hour, then heated to 230° C. After most of the chlorobenzene had been distilled off (approximately 90%), an additional funnel was attached to the flask and chlorobenzene was added dropwise at a rate sufficient to maintain a slow reflux. Heating was continued for 4 hours at which point the mixture was quite viscous. It was allowed to cool to 130° C., and 55 g of chlorobenzene was added followed by 0.25 g of sodium hydroxide in 2 ml of water and methyl chloride was bubbled through the solution for ½ hour. At the end of this period, 90 ml of chlorobenzene was added and the reaction mixture was allowed to cool to room temperature, then was filtered through a course porosity sintered glass funnel. The filtration process takes 1 to 4 hours. The polymer solution was coagulated in methanol and the polymer was isolated by filtration. It was restirred in methanol and reground in a blender and filtered again. Finally, it was boiled in 5 weight percent of oxalic acid for 3 hours and dried at 90° C. in a vacuum oven. The reduced viscosity, measured at 25° C. at a concentration of 0.2 g/dl in N-methyl pyrrolidinone (NMP) was 0.57 dl/g. Substantially the same equipment and procedure were used for all of the copolymers.

Examples 2 to 10; Controls A to C

The procedure of Example 1 was substantially followed in preparing these examples and controls. The moles of 4,4,'-bis(4-chlorophenyl sulfonyl)biphenyl, biphenol, B is phenol A, dihydroxy diphenyl sulfone and hydroquinone used in the reaction are shown in Table I. The reduced viscosities for these polymers lay in the range 0.42 to 0.60, dl/g, measured at 25? C., using a concentration of 0.2 g/dl in NMP.

TABLE I

| Ex. No. | BCSBP (m mol) | HQ (m mol) | Biphenol (m mol) | Bis S (m mol) | Bis A (m mol) |
|---|---|---|---|---|---|
| A | 9.0 | — | — | 9.0 | — |
| B | 9.0 | 9.0 | — | — | — |
| C | 9.0 | — | 9.0 | — | — |
| 2 | 9.0 | 8.55 | 0.45 | — | — |
| 3 | 9.0 | 6.75 | 2.25 | — | — |
| 4 | 9.0 | 4.5 | 4.5 | — | — |
| 5 | 9.0 | 2.25 | 6.75 | — | — |
| 6 | 9.0 | — | 6.75 | 2.25 | — |
| 7 | 9.0 | — | 4.5 | 4.5 | — |
| 8 | 9.0 | 5.4 | — | 3.6 | — |
| 9 | 9.0 | 2.2 | — | 6.8 | — |
| 10 | 9.0 | — | 4.5 | — | 4.5 |

Notes:
BCSBP = 4,4'-bis(4-chlorophenylsulfonyl)biphenyl;
HQ = hydroquinone; Bis S = 4,4'-dihydroxydiphenyl sulfone;
Bis A = bisphenol A.

After coagulation in methanol, crystallinity was determined by X-ray diffraction for Examples 3,9 and A, B and C. Control C was crystalline, Control B was slightly crystalline, and Control A and Examples 3 and 9 were amorphous.

The polymers of Examples 2 to 10 and Controls A to C were molded into a 4×4×0.020 inch plaque in a cavity mold at 380° C. The molding was done in a South Bend hydraulic press with heated platens. After pressing the plaque, the mold was cooled over a period of about 5 minutes to room temperature by passing water through the platens. The molded plaque was shear cut into ⅛ inch wide strips. These strips were tested for 1% secant modulus according to a procedure similar to ASTM D-638, tensile strength and elongation at break according to ASTM D-638, and pendulum impact strength. Pendulum impact strength is measured as follows: A steel pendulum is used, cylindrical in shape with a diameter of 0.83 inch and weighing 1.562 pounds; the striking piece, mounted almost at the top of the pendulum is a cylinder 0.3 inch in diameter; film specimens, 4 inches long, 0.125 inch wide and about 1 to 30 mils thick are clamped between the jaw of the tester so that the jaws are spaced 1 inch apart; the 0.125 inch width of the film is mounted vertically; the pendulum is raised to a constant height to deliver 1.13 foot pounds at the specimen; when the pendulum is released the cylindrical striking piece hits the specimen with its flat end, breaks the film, and travels to a measured height beyond; the difference in the recovery height (i.e., the difference in the potential energy of the pendulum at the maximum point of the upswing) represents the energy absorbed by the specimen during the rupture; the impact strength, expressed in foot-pounds per cubic inch, is obtained by dividing the pendulum energy loss by the volume of the specimen. The melt flow of the polymer was measured according to ASTM D-1238. Also, the glass transition temperature of the polymers was measured by the method described by Olabisi, et. al. in Polymer-Polymer Miscibility, Academic Press, New York, (1979), pp 126–127. The mechanical properties for the polymers of Examples 3–10 and the Controls A-C are summarized in Table II. Except as otherwise noted, the results are the average properties of several preparations or runs.

To evaluate solvent and stress craze resistance, test specimns (⅛ inch wide and 25 mils thick cut from a compression molded sample) were placed under 1000 psi stress and a cotton swab saturated with acetone was attached to the center of the test specimen. The time for the specimen to rupture was then recorded. The results are summarized in Table II.

Blister and moisture absorption test data for representative resins and commercial polysulfones were also obtained. The moisture tests were carried out on 20 mil thick molded plaques by immersing the plaques in water at 25°, and measuring water uptake to the equilibrium value. Blistering characteristics were then measured by cutting 1" squares from the plaques and immersing in molten solder. Successive tests were made at increasing temperatures until blistering or bubbling was noted. This temperature is reported as the blistering temperature. As further controls, Astrel 360, from 3M Company, a polysulfone having

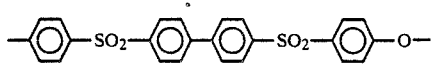

repeat units, and PES 200, from Imperial Chemical Industries, Ltd., a polysulfone with

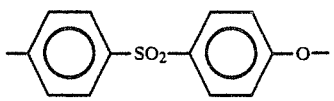

repeating units, were tested. For Astrel 360, the Tg was 285° C., the moisture absorption was 3.1% and the blister temperature was 200° C. For PES 200, the Tg was 220° C., the moisture absorption was 2.1% and the blister temperature was 210° C. The blister test data for compositions of this invention are reported in Table II.

The following terms and abbreviations are used in Table II: HQ, Bis S, Bis A, see Note to Table I; Tens. Str.=tensile strength; Yield El=yield elongation; El- =elongation-at-break; Pend. Imp.=pendulum impact at failure, see discussion following Table II; ESCR=environmental stress crack resistance at 1000 psi stress; time is in minutes (') unless otherwise noted; H2O Abs.- =equilibrium water absorption at 25° C.; Blister temp=blister temperature, see discussion hereinabove; NCNB=no craze, and sample was not brittle in bend test; R=ruptured in test after indicated time.

mers compared with the control materials, together with a reduced tendency toward crystallization, results in more readily processable compositions. It will be seen that a biphenol-hydroquinone polymer with less than 50 mole % hydroquinone (based upon total dihydroxy monomers present) and a biphenol-dihydroxydiphenyl sulfone polymer with less than 25 mole % bisphenol present have much improved environmental stress crack resistance (ESCR) to acetone, as shown by the absence of crazing or rupture after extended period. See Examples 4 and 6, Table II. Further, these polymers have significantly better resistance to acetone than the biphenol copolymer of Control C, which ruptured after brief exposure.

The blister test data for Examples 4 and 6 demonstrate the reduced moisture absorption and substantial improvement in blister temperature characteristic of these materials when compared with the commercial polysulfones Astrel 360 and PES 200. The biphenol homopolymer, Control C, exhibits similar blister properties.

The invention will thus be seen to be a novel aryl ether sulfone polymer having improved toughness, moisture and solvent resistance. The preferred polymers of this invention are copolymers comprising 50 mol % divalent 4,4'-bis(phenylsulfonyl)biphenyl structural units, together with 50 mole % of a mixture of at least two divalent structural units selected from diphenyl sulfone, biphenyl, phenylene and 2,2 diphenyl propane, all linked through ether oxygens attached preferably at the 4,4' positions of the polynuclear aromatic units and at the 1,4 positions of the phenylene nucleus. Although the invention has been illustrated by way of the non-limiting examples presented herein,

TABLE II

| Example: | 3 | 4 | 5 | 6 | 7 | 8 | 9 | 10 | A | B | C |
|---|---|---|---|---|---|---|---|---|---|---|---|
| Composition: | | | | | | | | | | | |
| HQ | 75 | 50 | 25 | — | — | 60 | 25 | — | — | 100 | — |
| Biphenol | 25 | 50 | 75 | 75 | 50 | — | — | 50 | — | — | 100 |
| Bis S | — | — | — | 25 | 50 | 40 | 75 | — | 100 | — | — |
| Bis A | — | — | — | — | — | — | — | 50 | — | — | — |
| Properties: | | | | | | | | | | | |
| Tens. Str., Kpsi. | 12.1 | 12.7 | 12.3 | 11.4 | 11.6 | 12.4 | 12.7 | — | 13.3 | 12.7 | 10.8 |
| Yield El. % | 10 | 10 | None | 10 | 10 | None | None | — | None | None | None |
| El., % | 11 | 13 | 11 | 15 | 13 | 10.5 | 10 | — | 9 | 10 | 9 |
| 1% Sec. Mod., Kpsi. | 246 | 260 | 246 | 240 | 227 | 211 | 253 | — | 275 | 274 | 248 |
| Pend. Imp., ft-lb/in$^3$ | 78 | 108 | 90 | 128 | 104 | 86 | 89 | — | 105 | 102 | 105 |
| Tg, °C. | 255 | 255 | 250 | 262 | 265 | 260 | 260 | — | 265 | 265 | 265 |
| ESCR, Acetone | 0.5' | 3.4 hr | — | 22 hr | 0.5' | 0.15' | 0.5' | — | — | 0.5' | 16' |
| (1000 psi strain) | R | NCNB | — | NCNB | R | R | R | — | — | R | R |
| H$_2$O Abs., %, 25° C. | 1.8 | 2.0 | — | — | 2.2 | — | — | 1.7 | — | — | 1.7 |
| Blister temp., °C. | 230 | 230 | — | — | 230 | — | — | 230 | — | — | 230 |

It will be apparent from a consideration of the properties of the polymers of this invention, and particularly those properties summarized in Table II, that these polymers have substantially improved properties compared with the prior art polymers represented by the Control examples. The compositions of this invention, and particularly those with phenol ratios near the mid range, exhibit enhanced toughness compared with prior art materials. Evidence of improved toughness is shown by the existence of an elongation-at-yield value and by higher elongation-at-break values for many of these combinations. The reduced tendency of the polymers of this invention toward crystallization presents additional advantages, particularly in minimizing the difficulties that otherwise are created by crystallization of the resin during the preparation and purification process steps. The reduction in Tg values observed for these copolyfurther variations and modifications will be readily apparent to those skilled in the art. Such variations and modifications may be made without depicting from the spirit and scope of the invention, which is defined only by the following claims.

What is claimed is:

1. An aryl ether sulphone polymer containing the following ether-liked structural units:

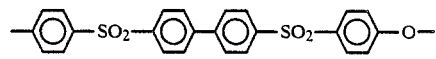

and at least two of the following:

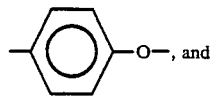, and

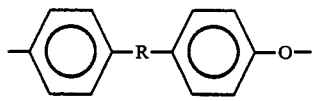

wherein R is selected from SO$_2$, SO, CO, O, C$_1$-C$_4$ alkylidene and a direct bond.

2. The aryl ether sulfone polymer of claim 1 containing the following ether-linked structural units:

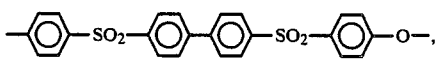

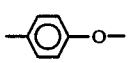

and at least one unit having the structure:

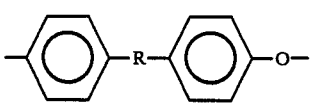

wherein R is selected from SO$_2$, SO, CO, O, C$_1$-C$_4$ alkylidene and a direct bond.

3. The aryl ether sulfone polymer of claim 1 containing the following ether-linked structural units:

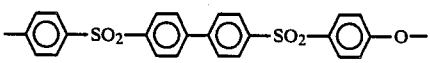

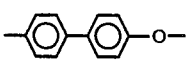

and at least one unit having the structure:

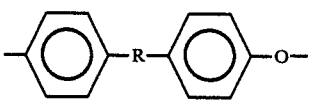

wherein R is selected from SO$_2$, SO, CO, O, and C$_1$-C$_4$ alkylidene.

4. A aryl ether sulphone polymer containing the following ether-linked structural units:

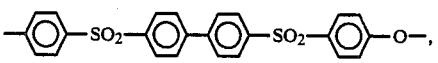

and at least two of the following:

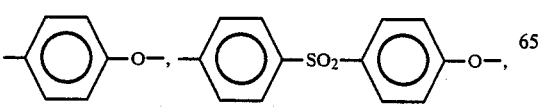

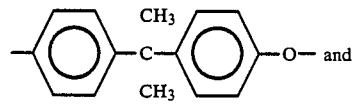

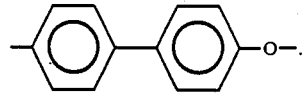

5. The polymer of claim 4, wherein the structural units are:

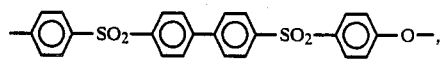

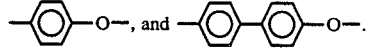

6. The polymer of claim 4, wherein the structural units are:

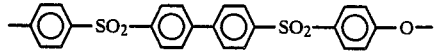

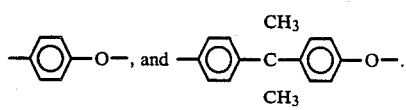

7. The polymer of claim 4 wherein the structural units are:

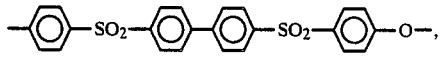

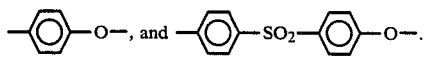

8. The polymer of claim 4 wherein the structural units are:

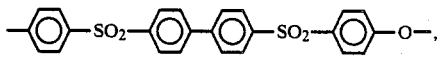

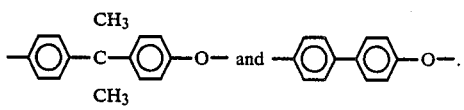

9. The polymer of claim 4 wherein the structural units are:

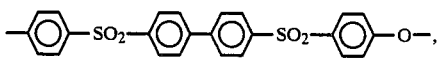

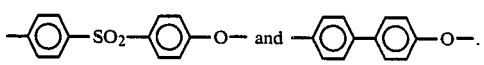

10. An aryl ether sulfone polymer consisting of from 90 to 10 mole % of a biphenyl-containing structural unit:

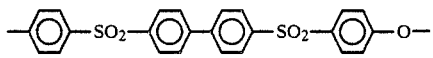

and correspondingly, 10 to 90 mole % of a mixture of at least two additional structural units selected from:

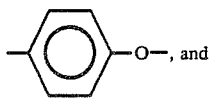

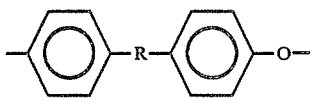

wherein R is selected from $SO_2$, SO, O, CO, $C_1$-$C_4$ alkylidene and a direct bond, and wherein said structural units are linked through ether oxygens.

11. The composition of claim 10 consisting of 50 mole % of the said biphenyl-containing structural units and 50 mole % of said additional structural units.

12. The composition of claim 10 consisting of two additional structural units.

13. The composition of claim 12 wherein the mole ratio of said two additional structural units is in the range of from 95/5 to 5/95.

14. The composition of claim 12 wherein said two additional structural units are present in a mole ratio of from 75/25 to 25/75.

15. The composition of claim 12 wherein the mole ratio of said two additional units is 50/50.

16. The composition of claim 12 wherein said two additional structural units are

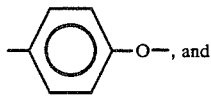

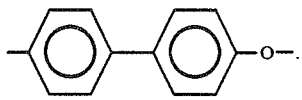

* * * * *